United States Patent
Icking et al.

[11] 3,722,761
[45] Mar. 27, 1973

[54] DEVICE FOR TRANSPORTING PRE-MEASURED AMOUNTS OF FEED

[76] Inventors: Paul Icking, Borkenwirthe 82, Borken; Hubert Ridder, Am Schwanenhof 27, Raesfeld, both of Germany

[22] Filed: May 3, 1971

[21] Appl. No.: 139,623

[30] Foreign Application Priority Data

June 24, 1970 Germany...............P 20 31 056.9
Feb. 10, 1971 Germany...............P 21 06 333.2

[52] U.S. Cl..................................................222/409
[51] Int. Cl................................................A01k 5/00
[58] Field of Search ...119/52 R, 56 R; 222/244, 246, 222/409, 334, 536; 214/17 C

[56] References Cited

UNITED STATES PATENTS

| | | | |
|---|---|---|---|
| 2,577,315 | 12/1951 | Ellerbeck | 222/409 X |
| 2,432,852 | 12/1947 | Arvidson | 222/328 |
| 2,422,470 | 6/1947 | Cover | 222/536 X |
| 3,207,382 | 9/1965 | Chappuis | 222/409 X |
| 3,180,318 | 4/1965 | Fisher | 119/56 R |

*Primary Examiner*—Robert B. Reeves
*Assistant Examiner*—John P. Shannon
*Attorney*—Merchant & Gould

[57] ABSTRACT

The invention refers to a device for transporting premeasured amounts of granular feed to feeding stations by means of a horizontal feed transport tube above the feeding station and a drop-chute connected to the feed transport tube, whereby premeasured amounts are conveyed to the feeding station via the drop-chute.

11 Claims, 6 Drawing Figures

DEVICE FOR TRANSPORTING PRE-MEASURED AMOUNTS OF FEED

BACKGROUND OF THE INVENTION

Feed transport devices which provide for pre-measuring are generally known (German patents 1,181,482 and 1,230,256).

It is a disadvantage of these familiar devices that it is not possible to measure out amounts which are less than the volume of the drop-chute. In such circumstances it is not possible to feed single animals or to add small amounts of special materials to the feed.

In addition, these familiar devices have the disadvantage that movable parts which must be opened or operated to empty the storage container are located near the head of the animal. The animals can destroy these movable parts of the storage containers by bumping them and, since the animals soon learn that the feed begins to flow out when the movable parts are opened, they will constantly try to manipulate these parts. If, to avoid this disadvantage of the familiar containers, the storage containers are suspended very high, the efflux level of the feed is then so high that the feed spatters and scatters when it lands in the feeding trough.

Finally, there is a device for feeding cows which is known through German patent 1,256,483. Fine measuring cannot be accomplished with this familiar device, since otherwise the mixing device is turning in the tube and would there compress the feed. Also, the familiar device is very costly, since each feeding station requires its own motor and its own separate hand-drive.

SUMMARY OF THE INVENTION

In contrast to these familiar devices, the invention answers the task of creating a device for transporting pre-measured amounts of feed materials, whereby it is possible to continuously vary the amounts from zero to maximum and whereby individual measuring is possible for each single feed container, even though all feeding devices are simultaneously operable.

This task underlying the invention is resolved as follows: in a familiar fashion, a barrier plate is located in the interval beneath the outlet opening of the drop-chute while a conveyor mechanism is installed in the area of the cone-shaped pile into which the feed grains fall between the barrier plate and the outlet opening. The conveyor mechanism conveys the accumulated feed to the feeding trough. Furthermore, the amount of feed to be dispensed to the feeding trough can be regulated by changing the position and, if necessary, also the size of the cone-shaped mound and/or by the action of the conveyor mechanism on the cone shaped mound. Additional characteristics of the invention are explained hereafter.

BRIEF DESCRIPTION OF THE DRAWINGS

The accompanying drawing represents samples of the invention. Specifically.

DESCRIPTION OF THE PREFERRED EMBODIMENTS

Figure 1:
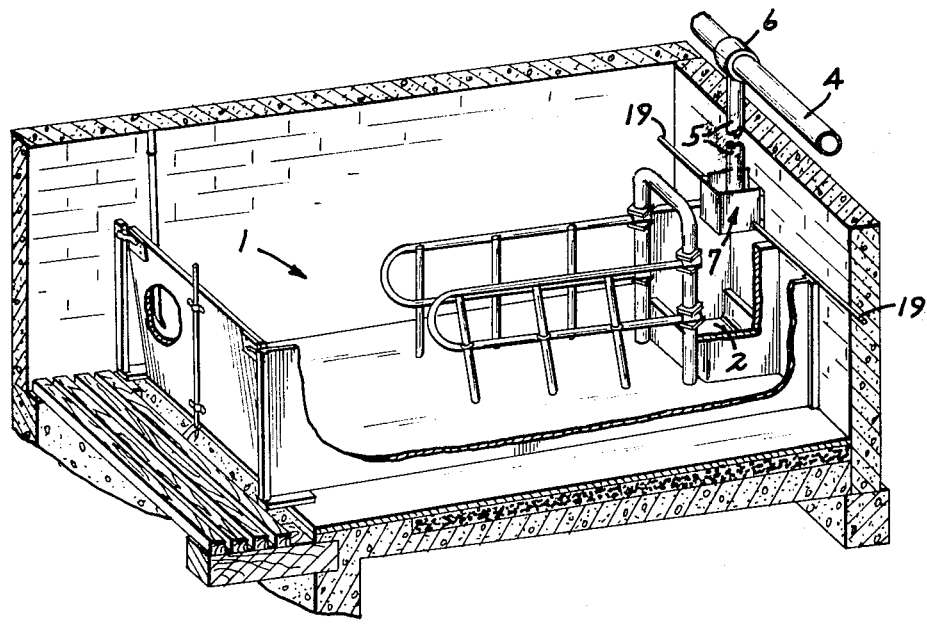
FIG. 1 presents an overall view of an initial model.

In the drawings, 1 generally designates a stall which is provided with a feeding trough 2, in front of which sow rails may be located.

Above and in the area of feeding trough 2 there is located a familiar feed transport tube 4, which might contain a worm gear by means of which the feed can be conveyed from a central storage container to the individual troughs. Adjacent to this feed transport tube there is a drop-tube 5 which is connected to feed transport tube 4 by means of a coupling 6, which is rotatable on the longitudinal axis of the feed transport tube and thus also permits rotation of drop-tube 5 on the longitudinal axis of feed transport tube 4.

Figure 2:
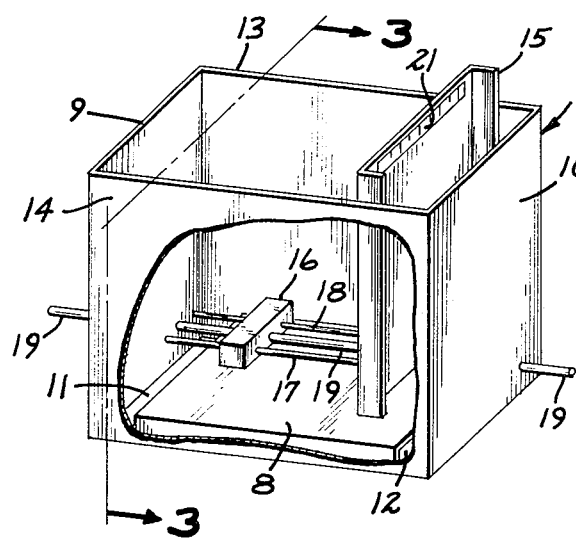
FIG. 2 shows the protective container on a larger scale.
Figure 3:
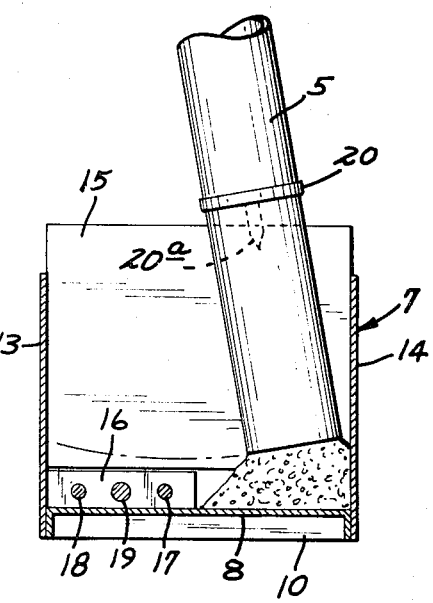
FIG. 3 shows the protective container in section according to the section plane 3—3 in FIG. 2.

The feed transport tube opens into a protective container 7 which is shown on a larger scale in FIGS. 2 and 3.

In the model according to FIGS. 2 and 3 the protective container 7 is as a basically rectangular or square container, the bottom plate of which is formed as a barrier plate 8 which in conjunction with the two side panels 9 and 10 provides two outlet openings 11 and 12. A front panel 14 and a rear panel 13 of the protective container are connected by a stabilizing panel 15, which assures the necessary stability of the whole container and, at the same time, makes it possible to indicate the adjustment of the rotatable drop-tube 5 into the desired position.

On the barrier plate 8, a pusher 16 may be slide-adjusted. In the model shown, this pusher 16 is guided by two guide-rods 17 and 18 which extend from side panel 9 to side panel 10. The back and forth movement is accomplished by a push-pull mechanism 19 which extends from trough to trough over the entire length of the stall complex and thus insures the simultaneous operation of all pushers in all protective containers.

The pusher itself may be made of plastic which both prevents corrosion and reduces friction between the pusher and barrier plate 8.

Drop-tube 5 possesses a fastening device 20 by which the drop-tube may be fastened to stabilizing panel 15, whereby at the same time a scale 21 may be provided on the stabilizing panel to facilitate adjustment for the desired amounts. The upper edge of the panel 15 is frictionally engaged between the drop-tube 5 and a downwardly extending pointer 20a supported by fastening device 20.

In particular, it is clear from FIG. 3 that the outlet opening of the drop-tube is located at a relatively small distance above barrier plate 8, whereby the size of pusher 16, the width of the container and the height of the outlet opening are so coordinated that the cone-shaped mound of the outflowing feed does not come in contact with the pusher when tube 5 is in one of the extreme positions within the container (as shown, for example, in FIG. 3). As a consequence, the back and forth movements of pusher 16 do not dispense any feed through outlet openings 11 and 12.

If drop-tube 5 is placed in the opposite position, which is not represented in FIG. 3, all the feed flowing out of the drop-tube 5 is moved by the pusher to the two outlet openings 11 and 12. In this way, the amounts measured depend on the size of the drop-tube, the height of the outlet opening of the drop-tube in the protective container and on the rapidity and the number of back-and-forth movements made by pusher 16.

Figure 4:
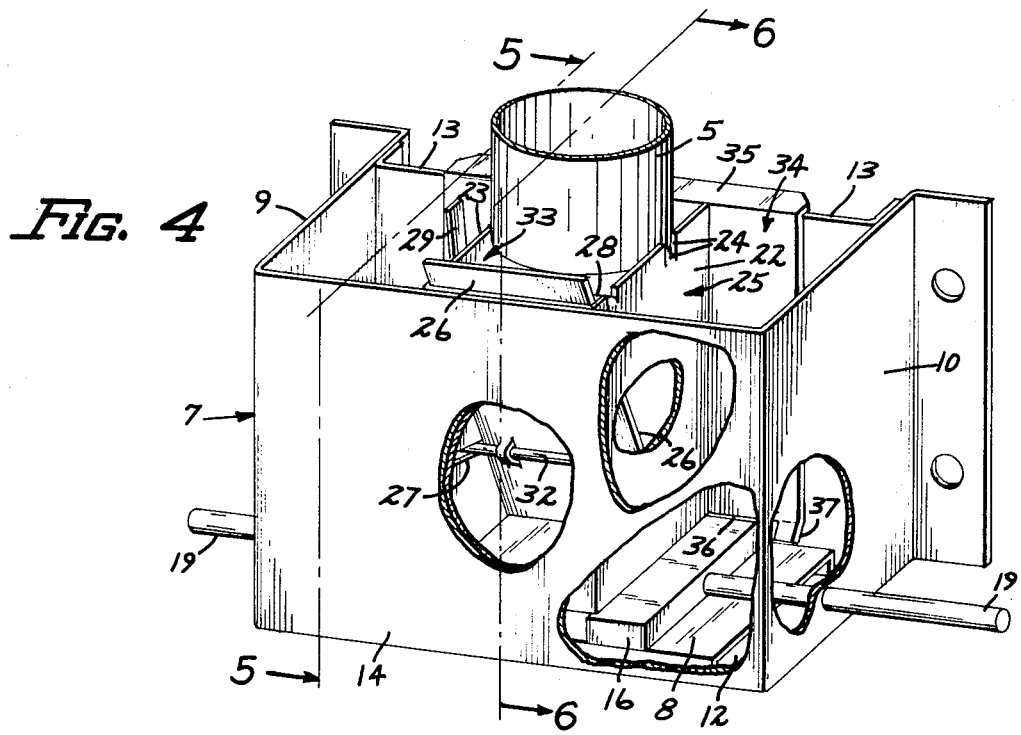
FIG. 4 shows in perspective a second model whereby several parts of a protective container and the enclosed storage container are exploded.
Figure 5:
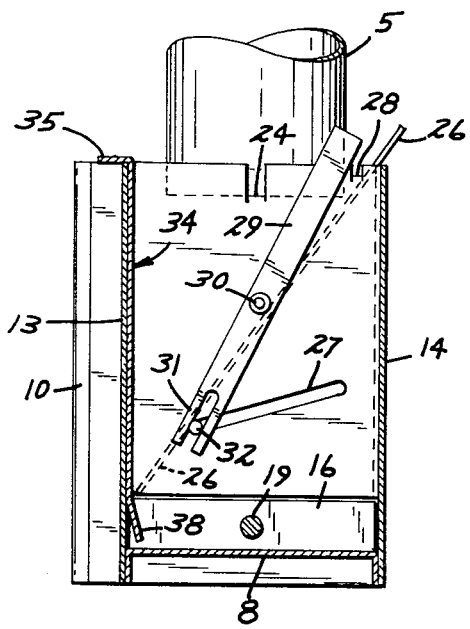
FIG. 5 is a sectional view according to the plane 5—5 in FIG. 4.
Figure 6:
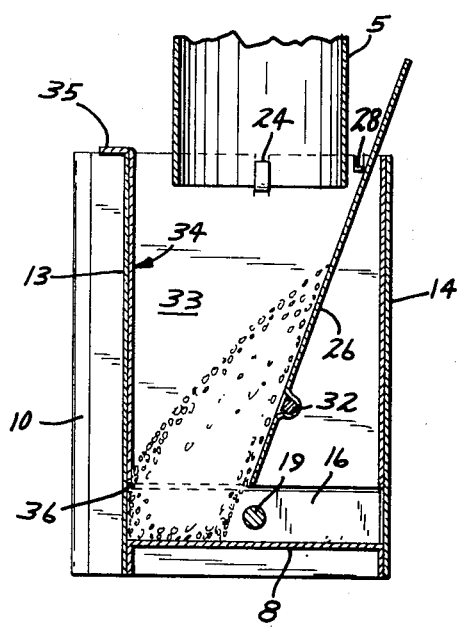
FIG. 6 is a sectional view according to the plane 6—6 in FIG. 4.

In the model illustrated in FIGS. 4 through 6, two panels 22 and 23 are provided inside protective container 7 perpendicular to the direction of motion of pusher 16. Together with side panels 13 and 14 of the protective container, these panels form an actual storage container 25, into which drop-tube 5 opens, which, as represented by 24, may be fastened to side panels 22 and 23.

A closure plate 26 crosses diagonally through storage container 25, whereby the lower opening of storage container 25 is closed. The closure plate 26 is held by an operation cam 32 in a long-hole guide 27 between the two side panels 22 and 23 and is fastened on the upper end of the storage container by means of a striking surface 28 in such a way as to permit up-and-down movements of closure panel 26 while preventing the plate from moving perpendicular to the storage container in its upper section.

On the outside of the storage container, on panel 23 of the illustrated model, 30 marks the location at which an operation lever 29 can be turned. Via a fork-piece 31, this operation lever communicates with operation cam 32 connected to closure plate 26, whereby the cam itself rests in a long-hole guide 27. Operation lever 29 is installed for turning at point 30 in such a way as to permit turning while inhibiting automatic return of operation lever 29. In this way the adjusted position of operation lever 29 is retained.

By moving lever 29 to the left, as shown for example in the model illustrated in FIG. 5, the lower portion of closure plate 26 is moved to the right via long-hole guide 27, such that in this way the opening width of the storage container can be regulated. A middle adjustment of this kind is visible in FIG. 6.

The feed 33 which is drawn in the storage container in FIG. 6 shows the formation of a cone-shaped mound of feed in the area of the actual barrier plate 8 which constitutes the bottom plate of protective container 7, which feed is dispensed when pusher 16 moves back and forth over the edge of barrier plate 8. In FIG. 4, the explosion of the side panels of protective container 7 reveals one of the outlet openings 12.

The drawings in FIGS. 4 and 5 clearly show that in addition to the side panel 13 of the container, a plate 34 is provided which constitutes the closure panel of storage container 25. The upper end of this plate 34 is bent at an angle, such that at flange 35 it is superincumbent on the upper edge of side panel 13 and can be freely moved back and forth inside the protective container 7 parallel to side panel 13. The back and forth movement of this plate 34 is accomplished as follows: the lower area of the plate has a depression 36 extending over a great portion of its length, into which the end of the pusher 16 may intrude. Two striking surfaces 37 and 38 are provided near the ends of the plate and are bent slightly toward the front and into the protective container. These protrude behind pusher 16 such that in the course of its back-and-forth motion, pusher 16 can move part of the way without affecting plate 34, specifically, until it pushes against striking surface 37 or 38 thus carrying plate 34 along over the remainder of its course with the result that the plate is moved parallel to side panel 13. Since plate 34 also forms a side panel of storage container 25, the destruction of any bridges which might develop in the feed material inside the storage container is thereby assured. This, in turn, insures an even flow of the feed material from the storage container to barrier plate 8.

In the model according to FIGS. 4 through 6, the push-pull mechanism 19 is constructed in the area of the protective container as a tube-shaped rod, whereby the necessary stability and secure position of pusher 16 inside protective container 7 is insured.

What is claimed is:

1. Apparatus for transporting pre-measured amounts of granular feed materials to feeding stations having a horizontally installed feed-transport tube above the feeding station and a drop-tube connected to the feed-transport tube, comprising:
   a. a protective container having front and rear panels, two opposite side panels and a bottom panel, said bottom panel having a pair of spaced outlet openings adjacent said opposite side panels, said drop-tube extending into said protective container with an outlet opening thereof located above said bottom panel;
   b. said bottom panel forming a barrier plate beneath said outlet opening of said drop-tube, said barrier plate being located above a feeding trough of said feeding station;
   c. a conveyor mechanism comprising a pusher mounted inside said protective container directly above said barrier plate;
   d. means for moving said pusher back and forth on the barrier plate in a path between said two outlet openings to convey feed deposited on said barrier plate by said drop-tube to the outlet openings in the course of the back and forth movements thereof; and
   e. means cooperating with said drop-tube for regulating the location and amount of feed flowing from said drop-tube onto said barrier plate in the path of said pusher, whereby the amount of feed dispensed into the feeding trough can be regulated by changing the amount of feed in the path of said pusher or the action of the conveyor mechanism, or both.

2. Apparatus according to claim 1 wherein said last-named means comprises means mounting said drop-tube for swinging movements thereof perpendicular to the direction of motion of said pusher from a position adjacent said rear panel to a position adjacent said front panel of said protective container to permit the position of said feed on said barrier plate to be changed with respect to said pusher, and wherein the width of said pusher is less than the width of said protective container between said front and rear panels thereof.

3. Apparatus according to claim 1 in which a storage container is installed in said protective container below said outlet opening of said drop tube with a bottom opening of the storage container being variable from closed to maximum passage to thereby regulate the location and amount of feed flowing from said drop-tube onto said barrier plate.

4. Apparatus according to claim 3 in which the bottom opening can be closed by means of a closure plate which traverses the storage container diagonally from bottom to top.

5. Apparatus according to claim 4 in which the closure plate is guided in such a way that the interval between the closure plate and the barrier plate remains constant.

6. Apparatus according to claim 5 in which the closure plate is guided by a long hole in a side panel of the storage container and in which said closure plate is adjusted by means of a lever which is installed outside the storage container.

7. Apparatus according to claim 1 in which the drop-tube is supported by the feed-transport tube and is rotatable about the longitudinal axis of said feed-transport tube.

8. Apparatus according to claim 3 in which a back panel of the storage container running parallel to the back-and-forth motion of the pusher is constructed as a movable plate which is moved back and forth with the pushing motion of the pusher.

9. Apparatus according to claim 8 in which the movably installed plate is moved by the pusher along only part of the course of the pusher.

10. Apparatus for transporting pre-measured amounts of granular feed materials to feeding stations having a horizontally installed feed-transport tube above the feeding station and a drop-tube connected to the feed-transport tube, comprising:
  a. a protective container having front and rear panels, two opposite side panels and a bottom panel, said bottom panel having a pair of spaced outlet openings adjacent said opposite side panels, said drop-tube extending into said protective container with an outlet opening thereof located a predetermined distance above said bottom panel;
  b. said bottom panel forming a barrier plate beneath said outlet opening of said drop-tube to form a cone-shaped mound of feed therebetween when feed is deposited on said barrier plate by said drop-tube, said barrier plate being located above a feeding trough of said feeding station;
  c. a conveyor mechanism comprising a pusher mounted inside said protective container directly above said barrier plate;
  d. means for moving said pusher back and forth on the barrier plate between said two outlet openings to convey feed to the outlet openings in the course of the back and forth movements thereof;
  e. means mounting said drop-tube for swinging movements thereof perpendicular to the direction of motion of said pusher from a position adjacent said rear panel to a position adjacent said front panel of said protective container to permit the position of said cone-shaped mound of feed on said barrier plate to be changed with respect to said pusher; and
  f. the width of said pusher being less than the width of said protective container between said front and rear panels whereby the amount of feed dispensed into the feeding trough can be regulated by changing the position of the cone-shaped mound of feed or the action of the conveyor mechanism, or both.

11. Apparatus according to claim 10 in which a stabilizing panel is provided which traverses the protective container parallel to the direction of swinging movements of the drop-tube.

* * * * *